No. 662,641. Patented Nov. 27, 1900.
A. W. GRANT.
DEVICE FOR EQUIPPING VEHICLE WHEELS WITH RUBBER TIRES.
(Application filed Sept. 23, 1899.)
(No Model.) 2 Sheets—Sheet 1.
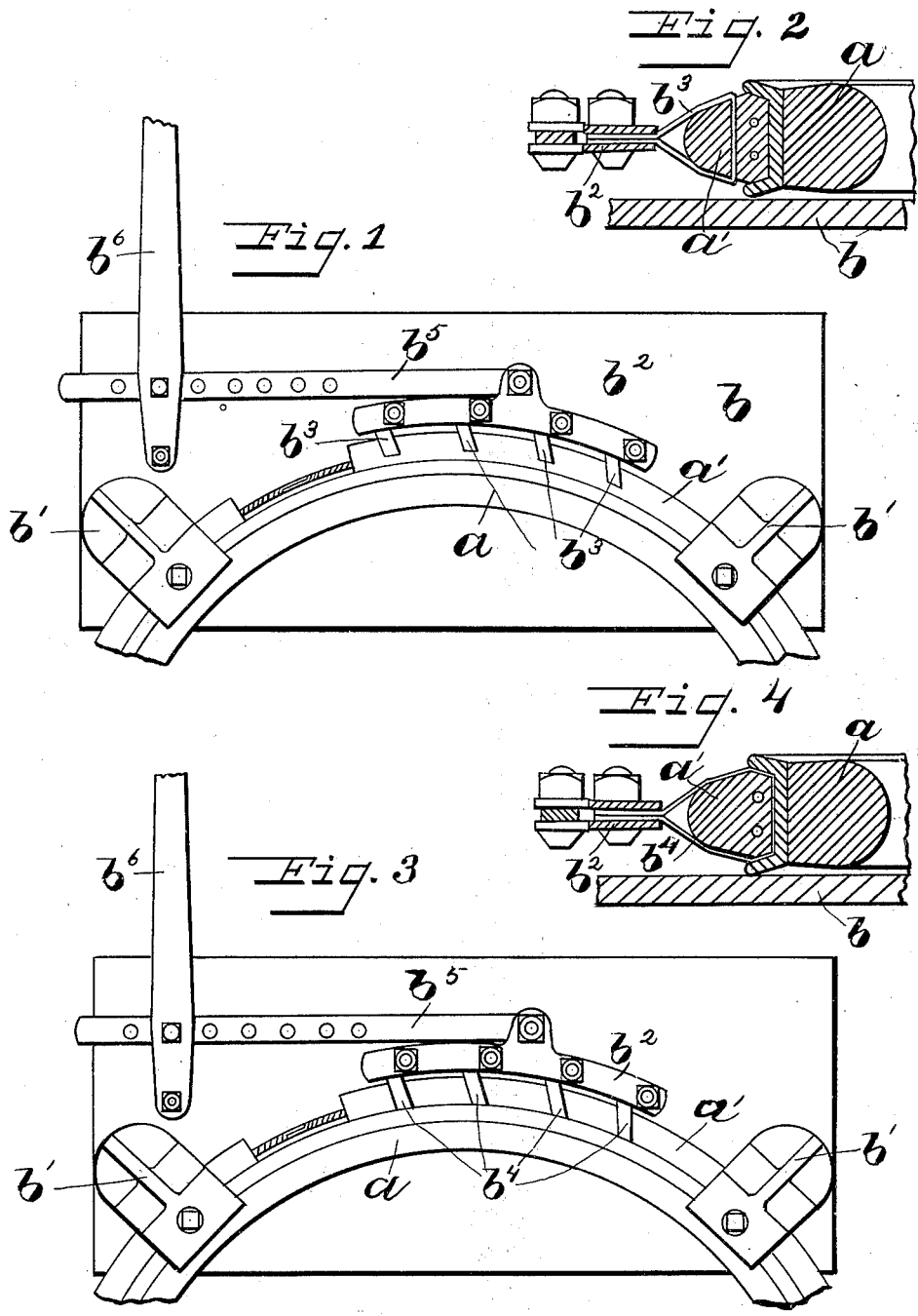

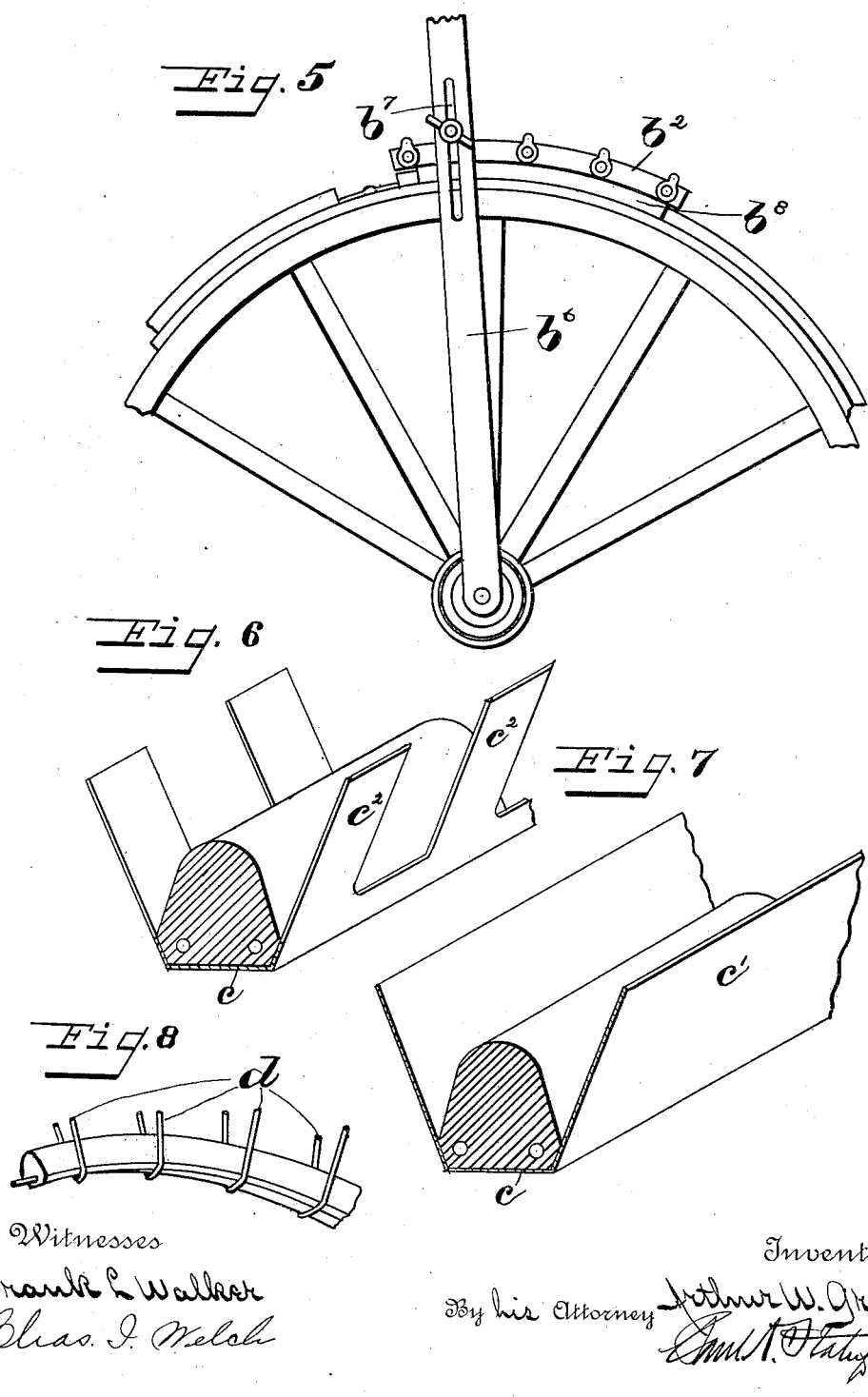

UNITED STATES PATENT OFFICE.

ARTHUR W. GRANT, OF SPRINGFIELD, OHIO, ASSIGNOR, BY MESNE ASSIGNMENTS, TO THE CONSOLIDATED RUBBER TIRE COMPANY, OF JERSEY CITY, NEW JERSEY.

DEVICE FOR EQUIPPING VEHICLE-WHEELS WITH RUBBER TIRES.

SPECIFICATION forming part of Letters Patent No. 662,641, dated November 27, 1900.

Application filed September 23, 1899. Serial No. 731,377. (No model.)

*To all whom it may concern:*

Be it known that I, ARTHUR W. GRANT, a citizen of the United States, residing at Springfield, in the county of Clark and State of Ohio, have invented certain new and useful Improvements in Devices for Equipping Vehicle-Wheels with Rubber Tires, of which the following is a specification.

My invention relates to improvements in devices for equipping vehicle-wheels with rubber tires, and it relates particularly to the class of rubber tires which are held in place on the peripheries of vehicle-wheels by an endless retaining band or bands which pass through the rubber, the rubber being seated in a groove or between the flanges of a metallic channel which is secured to the wheel-rim, and it relates more particularly to tires of this class in which the retaining band or bands are united while the tire is within the groove or channel, a space being left between the ends of the rubber to properly unite and secure the ends of the band or bands. After the bands are properly tightened and united difficulty has been experienced in closing this space between the ends of the rubber over the joints in the bands; and the object of this invention is to provide means for causing one or both ends of the rubber tire to travel in the channel and along the wires until the space is closed.

In the accompanying drawings, Figure 1 is a plan view of a device for carrying out my invention. Fig. 2 is a sectional view of the same. Fig. 3 is a plan view showing a slight modification in the position of the flexible strips hereinafter referred to. Fig. 4 is a sectional view of the same. Fig. 5 is a plan view of a modified form of my invention. Figs. 6, 7, and 8 are detail views showing further modifications in the flexible strips referred to.

Like parts are represented by similar letters of reference in the several views.

In forming a tire of the class to which this invention relates there is employed a single strip of rubber, through which is placed a retaining band or bands, the band or bands being left sufficiently long to project through the strip of rubber. The rubber is then placed in a flanged rim on the periphery of the wheel, with the ends of the band or bands overlapping, the band or bands being then tightened by any suitable and well-known means to cause them to bind the rubber tightly in the channel. The rubber is preferably slightly longer than the periphery of the wheel, and is compressed lengthwise as the wires are tightened to draw the rubber into the channel, this compression being necessary to provide for closing the space which must necessarily be left between the ends of the rubber at the point where the bands are united after the same have been sufficiently tightened. The bands having been tightened and the ends thereof united together, the rubber will be found to be practically immovable under ordinary conditions in the channel to close this space between the ends thereof, and I therefore accomplish this as follows: The wheel rim $a$ is clamped on a plate or table $b$ by suitable clamping devices $b'$, and a movable bar $b^2$ is connected to one end of the rubber portion of the tire $a'$, either by flexible strips $b^3$, of canvas or similar material, which may be formed in the rubber tire, as shown in Figs. 1 and 2, or by means of bands $b^4$, which are placed around the rubber before it is tightened in the channel, as shown in Figs. 3 and 4. This bar $b^2$ will be formed in the nature of a clamp or with clamping devices to engage the strips, and is also provided with means for moving it forcibly and longitudinally in the direction in which the rubber is to travel. In Figs. 1 and 3 I have shown the bar $b^2$ pivotally connected by a link $b^5$ to a lever $b^6$. The bar $b^2$ is thus permitted to follow the curvature of the wheel as pressure is applied thereto through the medium of the lever $b^6$, by means of which and the compression in the rubber the space between the ends of the rubber strip at the point where the joint in the bands is will be forcibly closed. In Fig. 5 I have shown means for accomplishing the same result in a little different manner, the lever $b^6$ being pivoted at the center of the wheel and the bar $b^2$ pivoted directly to the lever through a slotted opening $b^7$, which permits adjustment.

In this case I have shown a web $b^8$, of canvas or other material, molded into the rubber to secure the necessary connection between the clamping device and the tire.

In forming the rubber for the tire it is customary to place at the bottom of the tire friction-canvas, which is preferably vulcanized into the rubber. In Figs. 6 and 7 I have shown this canvas $c$ extended up to form the flexible connecting-strips. These strips may be made continuous, as shown at $c'$ in Fig. 7, or they may be made in sections $c^2$, as shown in Fig. 6.

In Fig. 8 I have shown the tire-connecting devices in the form of bands $d$, which partially encircle the rubber and pass between the channel and the rubber. This is probably the preferable means for making this connection, as metallic bands may be used, and they furnish to some extent bearings between the rubber and channel over which the rubber may easily slide. When the rubber is forcibly closed in this manner, the connecting devices between the rubber and the moving clamp are removed. In case they are molded into the rubber or connected to the friction-canvas they will be cut off at the sides of the rubber. In case they are passed around the rubber they may be either cut off at each side or, if properly tough and flexible, may be pulled out.

Having thus described my invention, I claim—

1. In combination with a wheel-support, a pivoted lever, a pulling-bar adjustably connected to said lever, clamping devices connected with said pulling-bar, and flexible connections between said pulling device and the rubber tire, said flexible connections being formed integrally with said tire, substantially as specified.

2. In connection with pulling devices for rubber tires, pulling-strips of canvas or similar material formed into said tire, the ends of said strips being adapted to be cut off when the tire is pulled into position, substantially as specified.

3. The combination with a wheel-support, of a pivoted lever, a pulling-bar adjustably connected to said lever, a rubber tire, pulling-strips of canvas or similar material formed integrally with said tire and clamping devices on said pulling-bar to clamp said pulling-strips, for the purpose of closing the space between the ends of said tire, the ends of said pulling-strips being adapted to be cut off when the tire is pulled into position, substantially as specified.

In testimony whereof I have hereunto set my hand this 16th day of September, A. D. 1899.

ARTHUR W. GRANT.

Witnesses:
CHAS. I. WELCH,
CLIFTON P. GRANT.